(12) United States Patent
Jading et al.

(10) Patent No.: US 8,279,846 B2
(45) Date of Patent: Oct. 2, 2012

(54) BROADCAST CHANNEL TIMING DETECTION

(75) Inventors: Ylva Jading, Stockholm (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 515 days.

(21) Appl. No.: 12/599,089

(22) PCT Filed: Mar. 25, 2008

(86) PCT No.: PCT/SE2008/050326
§ 371 (c)(1),
(2), (4) Date: Nov. 6, 2009

(87) PCT Pub. No.: WO2008/140386
PCT Pub. Date: Nov. 20, 2008

(65) Prior Publication Data
US 2011/0007728 A1    Jan. 13, 2011

(30) Foreign Application Priority Data

May 10, 2007 (SE) ...................................... 0701194

(51) Int. Cl.
*H04B 7/216* (2006.01)
*H04W 4/00* (2009.01)
(52) U.S. Cl. ........................................ 370/342; 370/328
(58) Field of Classification Search .................. 370/342, 370/328
See application file for complete search history.

(56) References Cited

U.S. PATENT DOCUMENTS

| | | | |
|---|---|---|---|
| 2004/0246998 A1 | 12/2004 | Ma et al. | |
| 2009/0003473 A1* | 1/2009 | Cho et al. | 375/260 |
| 2009/0149207 A1* | 6/2009 | Zhang et al. | 455/500 |
| 2009/0274112 A1* | 11/2009 | Ma et al. | 370/330 |
| 2010/0177697 A1* | 7/2010 | Tanno et al. | 370/328 |
| 2010/0232544 A1* | 9/2010 | Myung et al. | 375/295 |

FOREIGN PATENT DOCUMENTS

EP   0971489 A2   1/2000

OTHER PUBLICATIONS

3rd Generation Partnership Project. "Location of SCH and P-BCH." 3GPP TSG RAN WG1 Meeting #47bis, R1-070021, Sorrento, Italy, Jan. 15-19, 2007.

* cited by examiner

*Primary Examiner* — Kenny Lin
(74) *Attorney, Agent, or Firm* — Coats & Bennett, P.L.L.C.

(57) ABSTRACT

A broadcast control channel (BCH) transport block is communicated in a cellular communications system having a physical layer in which information is communicated in one or more frames, wherein the BCH transport block represents BCH information. This involves coding (901) the BCH transport block (1001, 1101) to generate M bits of coded information. $N_{frames}$ segments of coded bits are formed (903) from the M bits of coded information, wherein the BCH information can be derived from any one of the $N_{frames}$ segments of coded bits. A unique one of $N_{frames}$ mapping functions is applied (905) to each of the $N_{frames}$ segments of coded bits to produce $N_{frames}$ mapped segments of coded bits. A different one of the $N_{frames}$ mapped segments of coded bits is transmitted (907) in each of $N_{frames}$ frames. This enables multi-frame timing to be determined even when fewer than all BCH segments are received.

20 Claims, 13 Drawing Sheets

BROADCAST CHANNEL TIMING DETECTION

FIELD OF THE INVENTION

The present invention relates to methods and arrangements in a telecommunication system, and more particularly to methods and arrangements for detecting the timing of a broadcast channel in a cellular communication system.

BACKGROUND

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high-capacity high-data rate system in existing radio spectrum, a new system has to be able to utilize a bandwidth of varying size. A proposal for such a new flexible cellular system, called Third Generation Long Term Evolution (LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to and exceeding 100 Mb/s will be supported for the largest bandwidth. However, it is expected that LTE will be used not only for high rate services, but also for low rate services like voice. Since LTE is designed for Transmission Control Protocol/Internet Protocol (TCP/IP), Voice over IP (VoIP) will be the service that carries speech.

The LTE physical layer downlink transmission is based on OFDM. The basic LTE downlink physical resource can thus be seen as a time-frequency grid as illustrated in FIG. 1, in which each so-called "resource element" corresponds to one OFDM subcarrier during one OFDM symbol interval.

As illustrated in FIG. 2, the downlink subcarriers in the frequency domain are grouped into resource blocks, where each resource block consists of twelve consecutive subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

An important aspect of a terminal's operation is cell search. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on a physical layer broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of WCDMA. To assist the terminal in this procedure, LTE provides a primary synchronization signal and a secondary synchronization signal on the downlink. This is illustrated in FIG. 3, which illustrates the structure of the radio interface of an LTE system. The physical layer of an LTE system includes a generic radio frame 300 having a duration of 10 ms. FIG. 3 illustrates one such frame 300 for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. In addition to the synchronization signals, part of the operation of the cell search procedure also exploits reference signals that are transmitted at known locations in the transmitted signal.

In the first step of the cell-search procedure, the mobile terminal uses the primary synchronization signal to find the timing of the 5 ms slots. Note that the primary synchronization signal is transmitted twice in each frame. One reason for this is to simplify handover of a call from, for example, a GSM system, to an LTE system. However, transmitting the primary synchronization signal twice per frame creates an ambiguity in that it is not possible to know whether the detected Primary Synchronization Signal is associated with slot #0 or slot #5 (see FIG. 3). Accordingly, at this point of the cell-search procedure, there is a 5 ms ambiguity regarding the frame timing.

In many cases, the timing in multiple cells is synchronized such that the frame start in neighboring cells coincides in time. One reason for this is to enable Multicast/Broadcast Single Frequency Network (MBSFN) operation. However, synchronous operation of neighboring cells also results in the transmission of the primary synchronization signals in the different cells occurring at the same time. Channel estimation based on the primary synchronization signal will therefore reflect the composite channel from all such cells if the same primary synchronization signal is used in those cells. For coherent demodulation of the second synchronization signal, which is different in different cells, an estimate of the channel from the cell of interest is required, not an estimate of the composite channel from all cells. Therefore, LTE systems support multiple sequences for the primary synchronization signals. To enable coherent reception of a particular cell's signals in a deployment with time-synchronized cells, neighboring cells are permitted to use different primary synchronization sequences to alleviate the channel estimation problem described above. If there is a one-to-one mapping between the primary synchronization signal used in a cell and the identity within a cell group, the identity within the cell group can also be determined in the first step.

In the next step, the terminal detects the cell group and determines the frame timing. This is done by observing pairs of slots in which the secondary synchronization signal is transmitted. To distinguish between Secondary Synchronization Signals located in subframe #0 and subframe #5, the Secondary Synchronization Signals are constructed in the form (s1, s2). If (s1, s2) is an allowable pair of sequences, where s1 and s2 represent the secondary synchronization signal in subframes #0 and #5, respectively, the reverse pair (s2, s1) is not a valid sequence pair. By exploiting this property, the terminal can resolve the 5 ms timing ambiguity that resulted from the first step in the cell search procedure, and determine the frame timing. Furthermore, as each combination (s1, s2) represents a particular one of the cell groups, the cell group identity is also obtained from the second cell search step.

Finally, the cell identity within the cell group needs to be determined (unless it was already obtained from the first step). One possibility for achieving this is to exploit the reference signals in the last step of the cell-search procedure. The reference signals are created as the product of a pseudo-random sequence and an orthogonal sequence. The pseudo-random reference signal sequence is given by the cell group identity, which is already known from the second step. Hence, only the orthogonal reference sequence remains to be determined. Therefore, as there is a one-to-one mapping between the orthogonal sequence and the identity within the cell group, the cell identity can simply be obtained by correlating the received signal with the product of the pseudo-random sequence identified in the second step and all possible orthogonal reference signals. The orthogonal reference signal producing the highest correlation is taken to be the one that was used to generate the reference signal sequence, and this orthogonal reference signal then indicates the cell group identity.

Once the cell search procedure is complete, the terminal receives the system information to obtain the remaining parameters (e.g., the transmission bandwidth used in the cell) necessary to communicate with this cell. This broadcast information is transmitted on the BCH transport channel.

Present plans call for the downlink BCH in LTE systems to be transmitted with a Transmission Time Interval (TTI) of 40 ms, which translates into one BCH transport block being transmitted once every 40 ms. FIG. 4 is a block diagram illustrating the physical layer logical elements involved in BCH transport block transmission. When a BCH transport block 401 is presented for transmission, it is processed by cyclic redundancy check (CRC) logic 403, which generates a CRC value that is appended to the BCH transport block 401 to enable error detection to be performed at the receiver. The output of the CRC logic 403 is then provided to a block 405 that performs channel coding (e.g., Forward Error correction Coding, or "FEC"), modulation, and other known processing. The resulting block is then supplied to a demultiplexor 407, which allocates the resulting bits for transmission in four 1 ms subframes 409 occurring within a 40 ms TI. In LTE systems, this transmission occurs within the first subframe (subframe #0) in each 10 ms radio frame. Other systems are conceivable in which the BCH transport block is transmitted in other subframes.

As a result of the initial cell search, the UE will have ascertained the frame (10 ms) timing from the primary and secondary synchronization signals. While this information tells the UE what the start times of frames are, the UE still does not know the frame number of any frames it can identify. Consequently, the UE does not know to what set of four frames a BCH transport block is mapped. For this to be known, the UE would have to know the 40 ins timing.

This problem is illustrated in the timing diagram of FIG. 5, in which are shown a series of 10 ins slots. Assume that it is desired to find the four frames associated with a BCH transmission identified as BCH transmission x. The BCH transmission occurring just prior to BCH transmission x is denoted BCH transmission x−1, and the one occurring just after BCH transmission x is denoted BCH transmission x+1.

In order to properly decode the BCH and (at the same time) find the 40 ms timing, the UE could make four different assumptions regarding the 40 ms timing (and hence, four different assumptions regarding where the start of the BCH transport block is). In the illustrated example, the first assumption 501 groups the last two frames of BCH transmissions x−1 with the first two frames of BCH transmission x. The second assumption 503 groups the last frame of BCH transmissions x−1 with the first three frames of BCH transmission x. The third assumption 505 groups all four frames of BCH transmissions x together, and hence represents the correct 40 ms timing. The fourth assumption 507 groups the last three frames of BCH transmissions x with the first frame of BCH transmission x.

An algorithm for finding the correct 40 ms timing and decoding the BCH in the process would involve carrying out the decoding of one or more of the four assumptions 501, 503, 505, 507, and determining which one was correct, based on the CRC. If a decoding is correct, the UE can assume that the corresponding timing is the correct 40 ms timing. In the specific case shown in FIG. 5, the third assumption produces the correct 40 ms timing.

A benefit of spreading the BCH transport block transmission out over four 1 ms subframes, is that, under good channel conditions (e.g. when the UE is close to the base station), the UE may only need to receive one, two, or three of the four subframes and still be able to decode the BCH properly. Under such circumstances, the UE does not need to engage its receiver during the time span of the four subframes, and has an opportunity for reducing its power consumption.

In order for this to be possible, the BCH transmission in each subframe should be self-decodable on a per subframe basis so that, under sufficiently good channel conditions, it should be possible to decode the BCH utilizing only the information within a single subframe.

FIG. 6 is a block diagram illustrating the physical layer logical elements involved in a straightforward way of achieving this. When a BCH transport block 601 is presented for transmission, it is processed by CRC logic 603, which generates a CRC value that is appended to the BCH transport block 601 to enable error detection to be performed at the receiver. The output of the CRC logic 603 is then provided to a block 605 that performs channel coding (e.g. "FEC"). (Modulation and other known processing are performed as well, but omitted from the figure for clarity). Here, the channel coding has a coding rate, denoted "R", that enables the entire coded BCH to fit into a single subframe.

The resulting block is then supplied to copy logic 607, that creates a copy of the coded BCH bits, and allocates one copy into each of four 1 ms subframes 609 occurring within a 40 ms TTI. In LTE systems, this transmission occurs within the first subframe (subframe #0) in each 10 ms radio frame. Other systems are conceivable in which the BCH transport block is transmitted in other subframes.

Under good channel conditions, the coding will enable the UE to correctly decode the BCH transport block using the information (bits) conveyed by only a single one of the four subframes. When worse channel conditions prevail, the UE needs more energy for correct decoding. The UE can satisfy this requirement by soft combining (e.g. simply adding together) the signals received from multiple subframes (i.e., from two to four subframes) before decoding.

Another way of transmitting the BCH information in such a way that it is possible to correctly decode it using bits received from fewer than all four subframes is illustrated in FIG. 7. When a BCH transport block 701 is presented for transmission, it is processed by CRC logic 703, which generates a CRC value that is appended to the BCH transport block 701 to enable error detection to be performed at the receiver. The output of the CRC logic 703 is then provided to a block 705 that performs channel coding (e.g. "FEC"). (Modulation and other known processing are performed as well, but omitted from the figure for clarity). This arrangement differs from that depicted in FIG. 6 in that a lower channel coding rate is used (e.g., four times lower, represented by "R/4").

The resulting bits are then supplied to demultiplexor logic 707, that distributes the coded bits over the full set of four 1 ms subframes 709 occurring within a 40 ms TTI. In LTE systems, this transmission occurs within the first subframe (subframe #0) in each 10 ms radio frame. Other systems are conceivable in which the BCH transport block is transmitted in other subframes.

In this case, the arrangement relies on the channel code's capability to correct loss of data. In essence, using only a single subframe for the BCH decoding would correspond to a loss of at least 75% of the coded bits. A sufficiently low rate code $R_{low}$ can, in such a case, still provide correct decoding of the BCH transport block if the channel conditions are sufficiently good.

It is noted that an equivalent way of interpreting arrangements exemplified by that depicted in FIG. 6 is to assume that the lower rate channel code of FIG. 7 consists of a higher rate code followed by four times repetition. Such an arrangement is depicted in FIG. 8. When a BCH transport block 801 is presented for transmission, it is processed by CRC logic 803, which generates a CRC value that is appended to the BCH transport block 801 to enable error detection to be performed at the receiver. The output of the CRC logic 803 is then provided to a block 805 that performs channel coding (e.g., "FEC"). (Modulation and other known processing are performed as well, but omitted from the figure for clarity). The coding rate here is R (i.e., the rate that enables the entire coded BCH to fit into a single subframe).

The coded bits are then supplied to copy logic 807 that produces four copies of the coded BCH bits. The resulting bits supplied by the copy logic 807 are then supplied to demultiplexor logic 809, that distributes the coded bits over the full set of four 1 ms subframes 811 occurring within a 40 ms TTI. In LTE systems, this transmission occurs within the first subframe (subframe #0) in each 10 ms radio frame. Other systems are conceivable in which the BCH transport block is transmitted in other subframes.

It can be seen that allowing the BCH information contained in any one of the four subframes to be self-decodable (i.e. decodable without requiring BCH information from any of the remaining three subframes) can achieve significant efficiencies under good channel conditions. However, a problem with the self-decodability techniques illustrated in any of FIGS. 6, 7, and 8 is that the possibility of ascertaining the 40 ms timing can no longer be guaranteed. In essence, if the UE decodes the BCH using only one of the BCH subframes illustrated, for example, in FIG. 6, it can get a correct decoding (correct CRC) regardless of what subframe is used for decoding. Thus the UE will not be able to know which of the four possible subframes was used for the decoding and will thus not ascertain the 40 ms timing.

It should be noted that this is only a problem when the UE does not yet know the full timing of the cell. However, this does not render the problem insignificant because this is the case when, for example, the UE is making an initial access of the cell, or at the time of handover between cells that are not tightly time synchronized with each other.

It is therefore desired to provide methods and apparatuses that enable a UE (or other terminal in a mobile communications system) to be capable of correctly decoding BCH information based on fewer than all of the transmissions of that information (e.g., only one of four transmissions of that information), while still being capable of ascertaining the timing of those transmissions.

SUMMARY

It should be emphasized that the terms "comprises" and "comprising", when used in this specification, are taken to specify the presence of stated features, integers, steps or components: but the use of these terms does not preclude the presence or addition of one or more other features, integers, steps, components or groups thereof.

In accordance with one aspect of the present invention, the foregoing and other objects are achieved in methods and apparatuses that communicate a broadcast control channel (BCH) transport block in a cellular communications system having a physical layer in which information is communicated in one or more frames, wherein the BCH transport block represents BCH information. Such communication involves coding the BCH transport block to generate M bits of coded information, wherein M is an integer. $N_{frames}$ segments of coded bits are formed from the M bits of coded information, wherein the BCH information can be derived from any one of the $N_{frames}$ segments of coded bits. A unique one of $N_{frames}$ mapping functions is applied to each of the segments of coded bits to produce $N_{frames}$ mapped segments of coded bits. Since the BCH information can be derived from any one of the $N_{frames}$ segments of coded bits, it is this mapping that enables one segment to be distinguished from another. A different one of the $N_{frames}$ mapped segments of coded bits is then transmitted in each of $N_{frames}$ frames.

In some, but not necessarily all embodiments. $N_{frames}=4$.

In some, but not necessarily all embodiments, the $N_{frames}$ frames are $N_{frames}$ consecutively occurring frames.

In some embodiments, applying a unique one of $N_{frames}$ mapping functions to each of the $N_{frames}$ segments of coded bits to produce $N_{frames}$ mapped segments of coded bits comprises scrambling each of the $N_{frames}$ segments of coded bits by a unique one of $N_{frames}$ different scrambling patterns to produce $N_{frames}$ segments of scrambled bits, wherein for any one of the $N_{frames}$ segments of scrambled bits, successful derivation of the BCH information is assured only when a decoding process is applied to the $N_{frames}$ segments of coded bits.

In alternative embodiments, applying a unique one of $N_{frames}$ mapping functions to each of the $N_{frames}$ segments of coded bits to produce $N_{frames}$ mapped segments of coded bits comprises multiplying each of the $N_{frames}$ segments of coded bits by a different one of $N_{frames}$ different code elements ($c_1$, $c_2$, $c_3$, $c_4$,) to produce $N_{frames}$ segments of multiplied bits, wherein for any one of the $N_{frames}$ segments of multiplied bits, successful derivation of the BCH information is assured only when a decoding process is applied to the $N_{frames}$ segments of coded bits.

In another aspect of embodiments consistent with the invention, methods and apparatuses are able to receive a broadcast control channel (BCH) transport block and determine multi-frame timing in a cellular communications system having a physical layer in which information is communicated in one or more frames, wherein the BCH transport block represents BCH information. This involves receiving one or more of $N_{frames}$ mapped segments of coded bits that have been transmitted in a group comprising $N_{frames}$ frames. One or more inverse mapping functions are applied to the one or more received mapped segments of coded bits to produce one or more unmapped segments of coded bits, wherein the one or more inverse mapping functions are selected from $N_{frames}$ inverse mapping functions. At least one of the one or more unmapped segments of bits is tested to determine whether the at least one of the one or more unmapped segments of bits is correctly decodable. Multi-frame timing is ascertained based on which of the $N_{frames}$ inverse mapping functions resulted in a correctly decodable unmapped segment of bits.

In some but not necessarily all of the embodiments, $N_{frames}=4$.

In some but not necessarily all of the embodiments, the $N_{frames}$ frames are $N_{frames}$ consecutively occurring frames.

In some but not necessarily all of the embodiments, applying one or more inverse mapping functions to the one or more received mapped segments of coded bits to produce one or more unmapped segments of coded bits comprises applying one or more of $N_{frames}$ unscrambling functions to the one or more received mapped segments of coded bits to produce one or more unscrambled segments of coded bits.

In some alternative embodiments, applying one or more inverse mapping functions to the one or more received mapped segments of coded bits to produce one or more unmapped segments of coded bits comprises multiplying each of the one or more received mapped segments of coded bits by a conjugate of one or more of $N_{frames}$ code elements to produce one or more multiplied segments of coded bits.

BRIEF DESCRIPTION OF THE DRAWINGS

The objects and advantages of the invention will be understood by reading the following detailed description in conjunction with the drawings in which:

FIG. 9 can also be considered to depict a node and its relevant logic configured to carry out the functions described in the figure.

FIG. 10 can also be considered to depict a node and its relevant logic configured to carry out the functions described in the figure.

FIG. 11 can also be considered to depict a node and its relevant logic configured to carry out the functions described in the figure.

FIG. 12 can also be considered to depict a receiver and its relevant logic configured to carry out the functions described in the figure.

DETAILED DESCRIPTION

Figure 1:
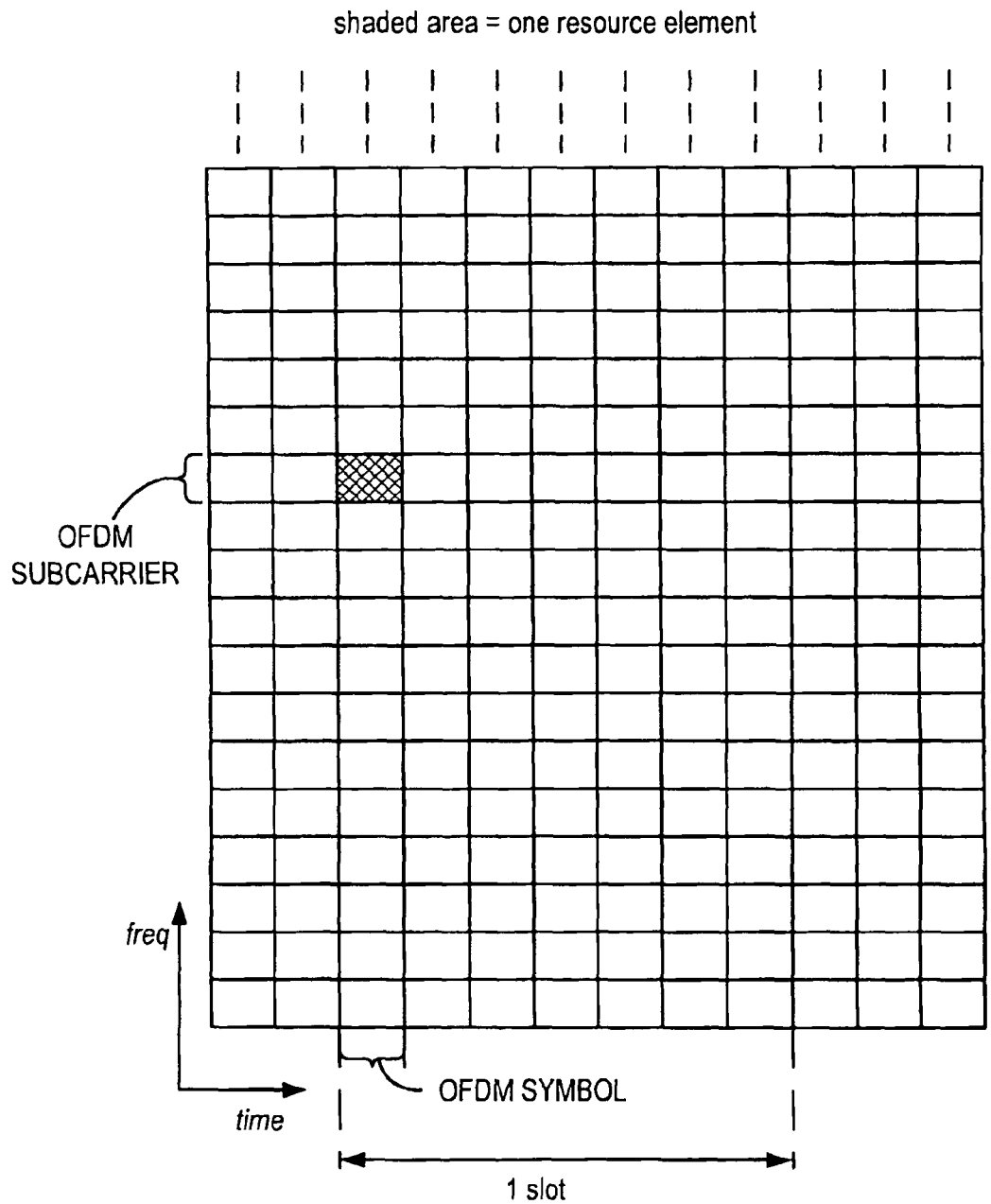
FIG. 1 depicts a time-frequency grid illustrating a basic LTE downlink physical resource, in which each so-called "resource element" corresponds to one OFDM subcarrier during one OFDM symbol interval.
Figure 2:
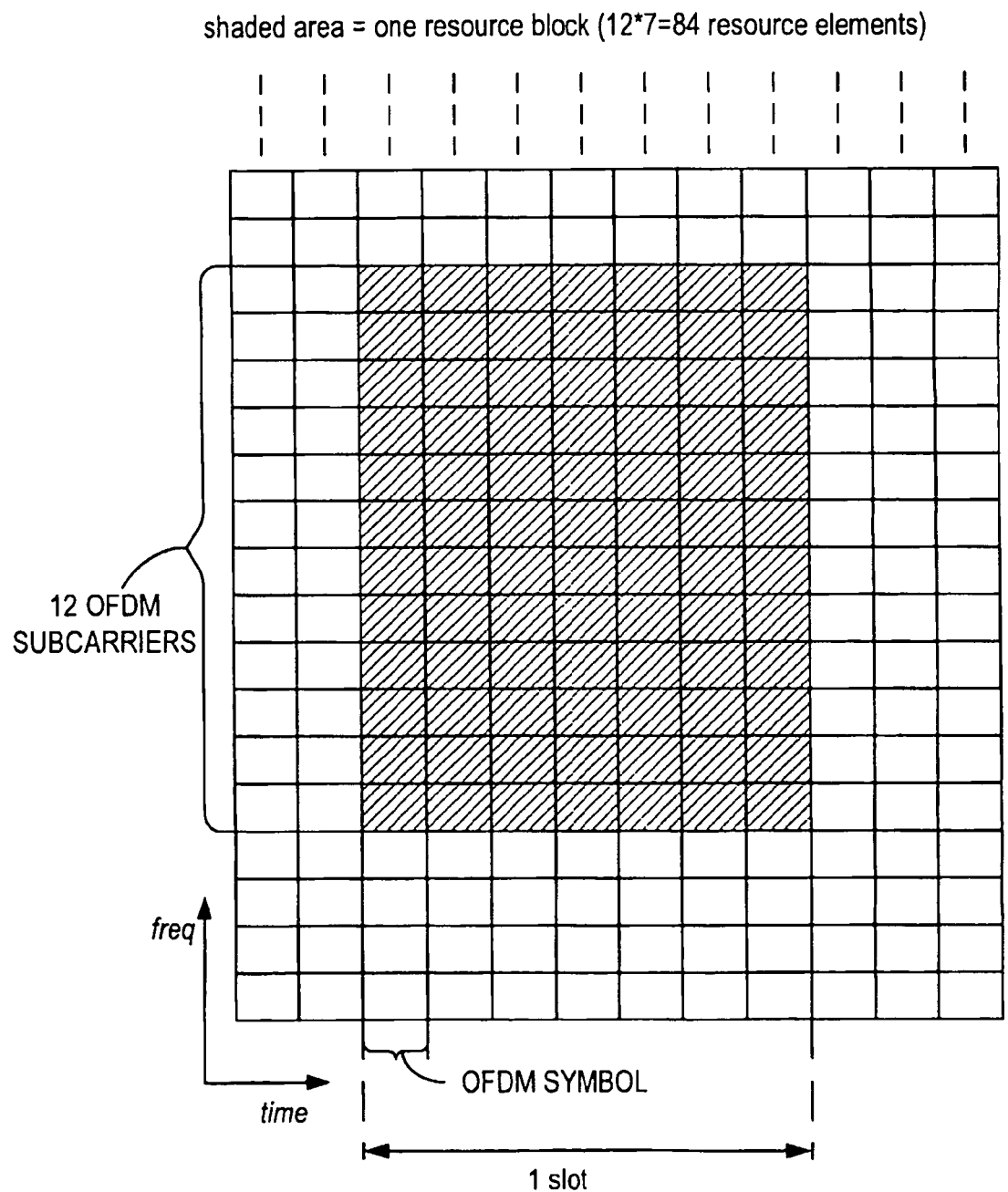
FIG. 2 illustrates how, in the frequency domain, the downlink subcarriers are grouped into resource blocks.
Figure 3:
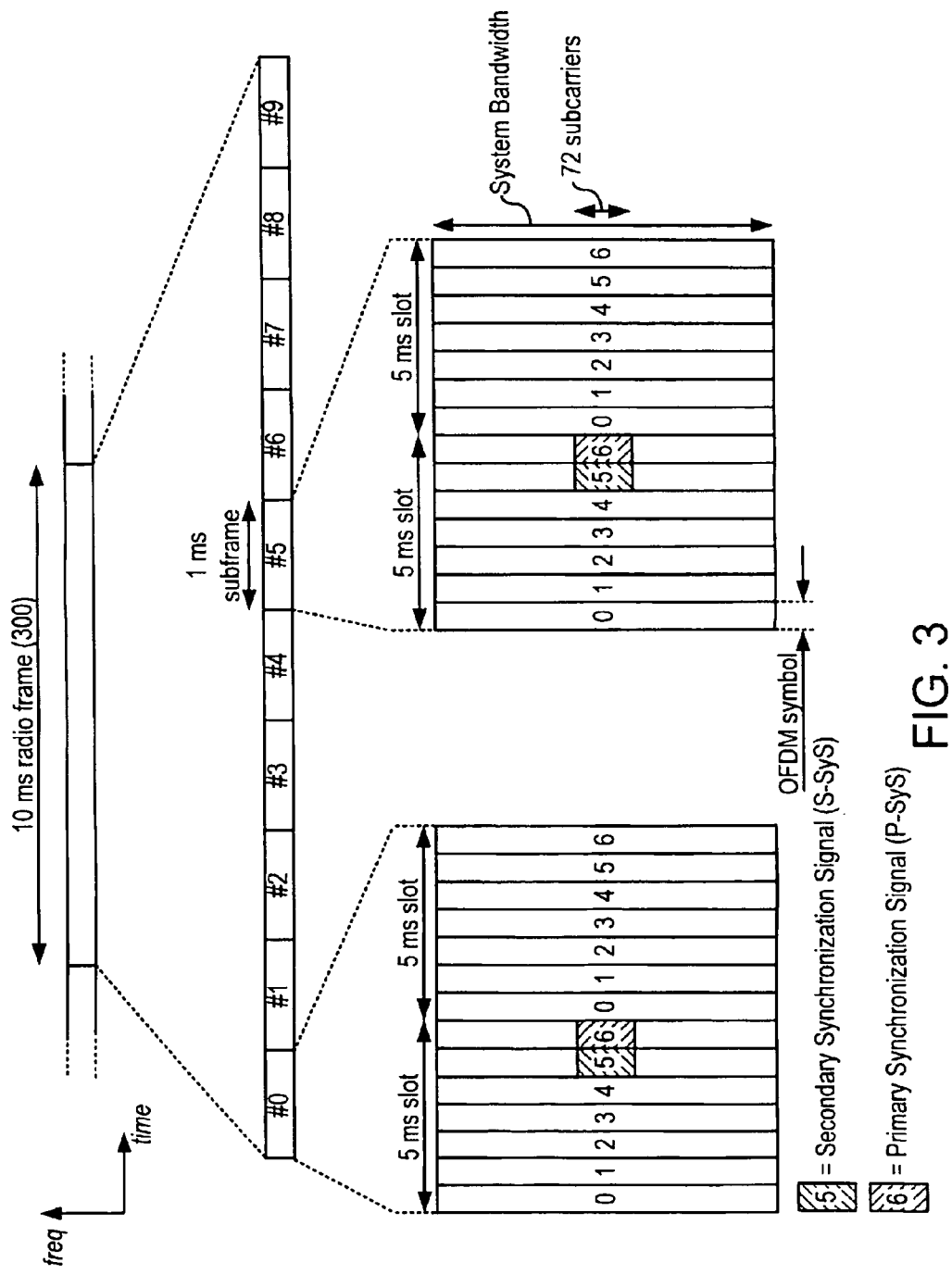
FIG. 3 illustrates the structure of the radio interface, including a radio frame, of an LTE system.
Figure 4:
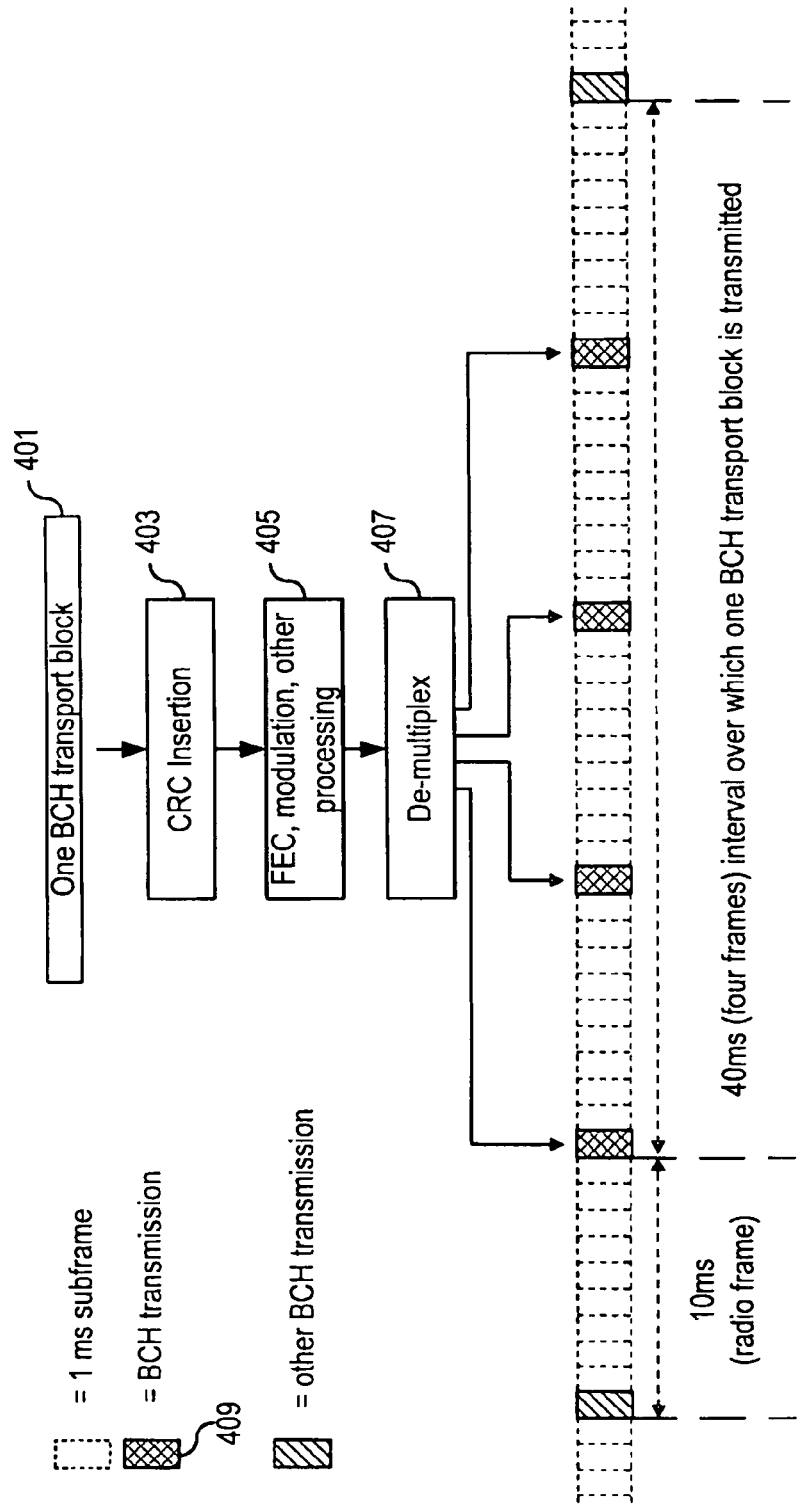
FIG. 4 is a block diagram illustrating the physical layer logical elements involved in BCH transport block transmission.
Figure 5:
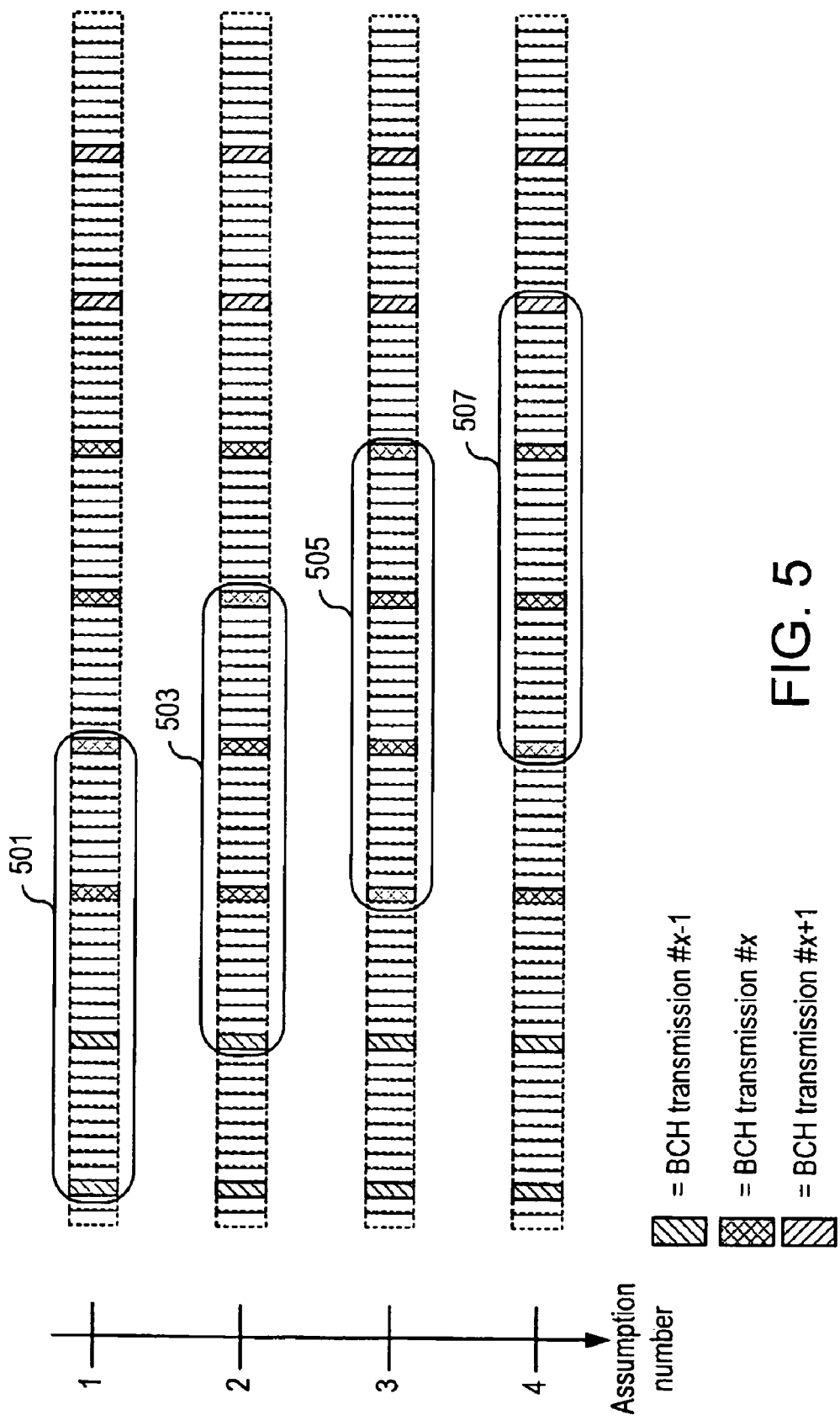
FIG. 5 is a signal timing diagram illustrating the transmission of BCH segments over the course of a number of frames.
Figure 6:
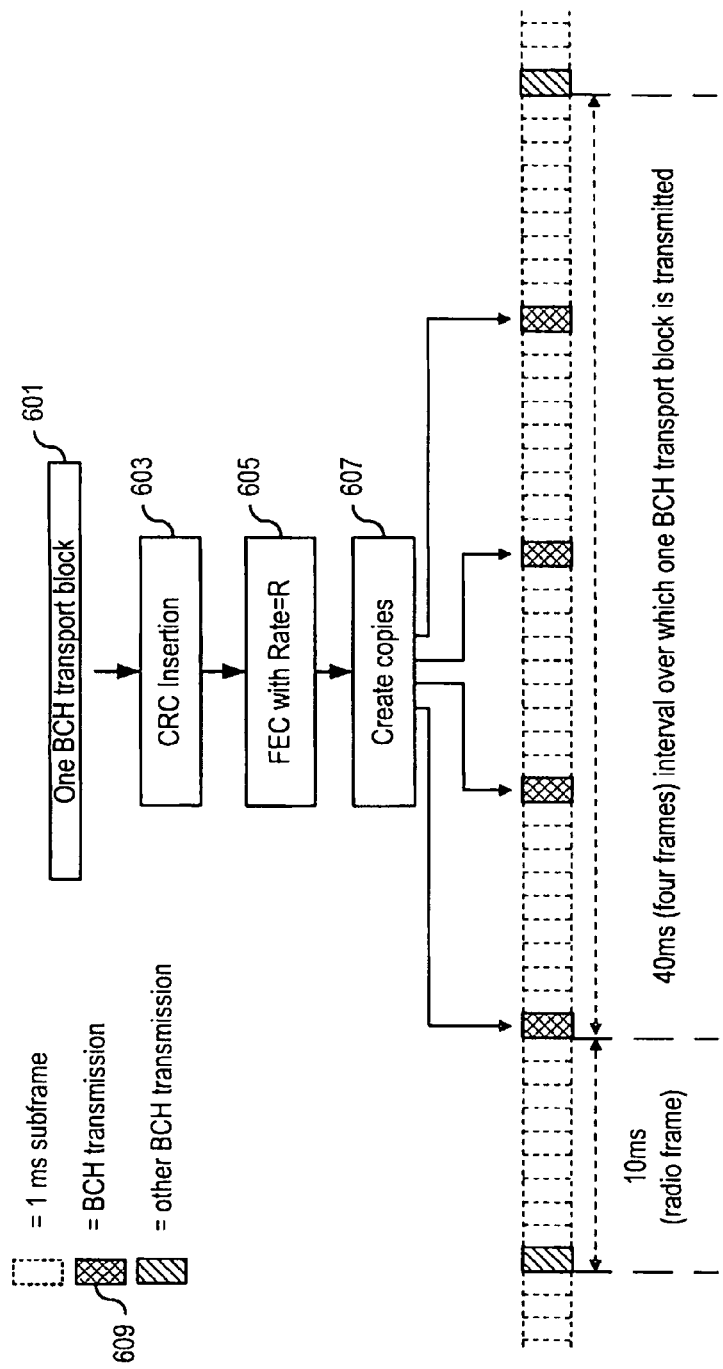
FIG. 6 is a block diagram illustrating the physical layer logical elements involved in a straightforward way of enabling the decoding of a BCH transport block without utilizing all of the BCH segments conveying that BCH transport block.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g. discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action or function, or alternatively as "logic that" performs a described action or function.

Figure 9:
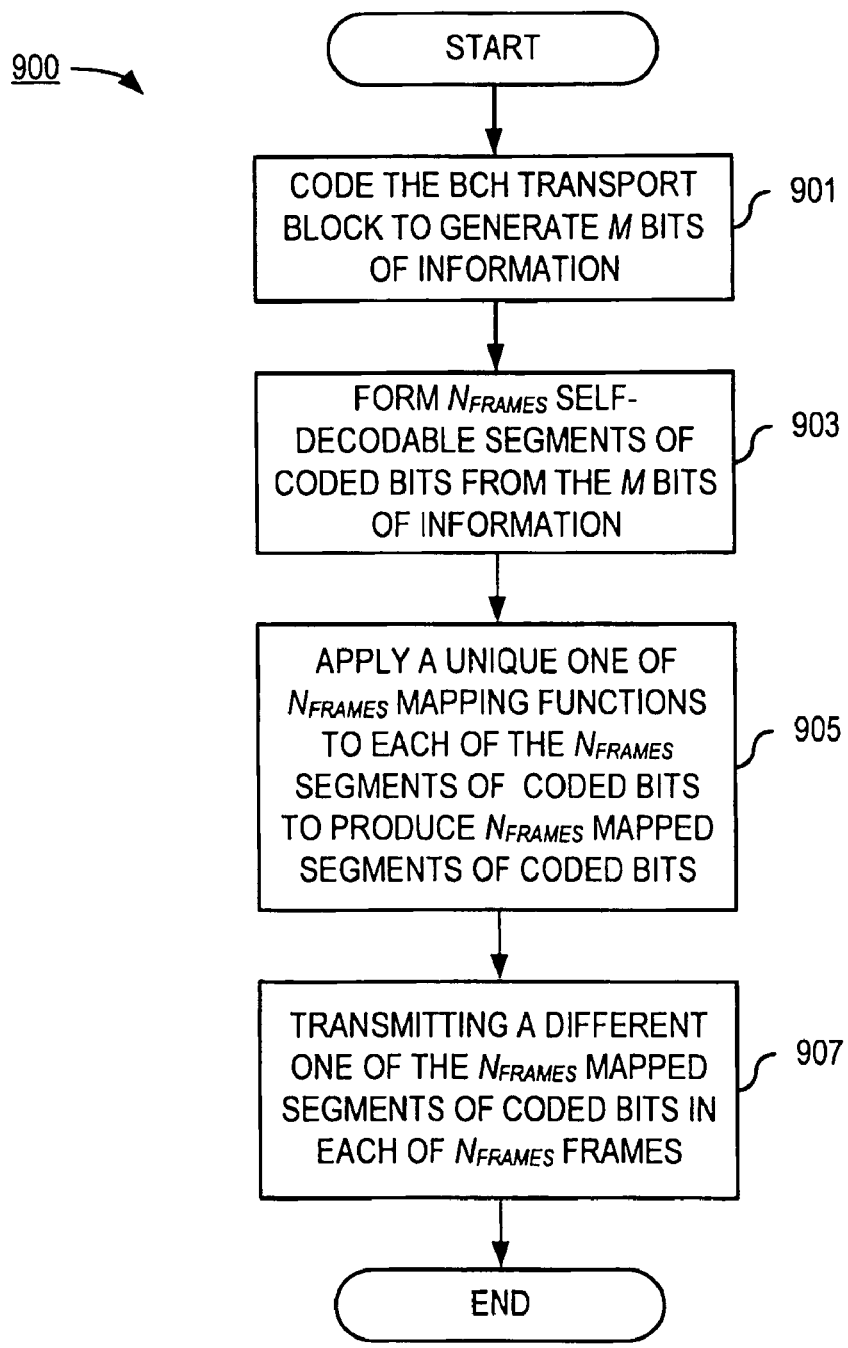
FIG. 9 is a flow chart/block diagram of steps/processes carried out in a node of a mobile communications system in accordance with an aspect of embodiments consistent with the invention.

FIG. 9 is a flow chart of steps/processes carried out in a node (e.g., a base station) of a mobile communications system in accordance with an aspect of embodiments consistent with the invention. FIG. 9 can also be considered to depict a node 900 and its relevant logic configured to carry out the functions described in the figure. Upon receiving a BCH transport block, the node 900 subjects it to typical processing (step 901) (e.g., CRC insertion, FEC) to generate the M bits of coded information that will be transmitted over the course of $N_{frames}$ frames (e.g., in an LTE system, $N_{frames}=4$). $N_{frames}$ self-decodable segments of coded information are then formed from the M bits of coded information (step 903).

Here it is important to recognize that the type of coding applied (e.g., type of FEC) should be such as to enable the $N_{frames}$ segments to each be self-decodable (i.e., to each be capable of reproducing the original BCH transport block through decoding without reference to any of the other segments). This can be achieved by, for example, applying channel coding having a rate such that the entire coded segment will fit into a single subframe. Another possibility is applying a lower coding rate (e.g. $N_{frames}$ times slower) and distributing the generated M bits of information over the $N_{frames}$ segments such that it is possible to rely on the code's capability to correct loss of data and thereby reproduce the original BCH transport block information.

In order to be able to distinguish one segment of coded bits from another, the node 900 applies a unique one of $N_{frames}$ mapping functions to each of the $N_{frames}$ segments of coded bits to produce $N_{frames}$ mapped segments of coded bits (step 905).

Finally, a different one of the $N_{frames}$ mapped segments of coded bits is transmitted in each of $N_{frames}$ frames (step 907). For example, in an LTE system, a different one of four mapped segments of coded bits is transmitted in each of four consecutively occurring frames. In other embodiments, the total number of segments/frames can be something other than four. Further, in other embodiments, the $N_{frames}$ frames need not be consecutively occurring.

The $N_{frames}$ mapping functions should be designed to enable one segment of coded bits to be distinguishable from another. There are a number of ways to do this. Two exemplary ways will now be described in detail. However, it should be understood that that the scope of the invention includes the use of other mapping functions not described here.

Figure 10:
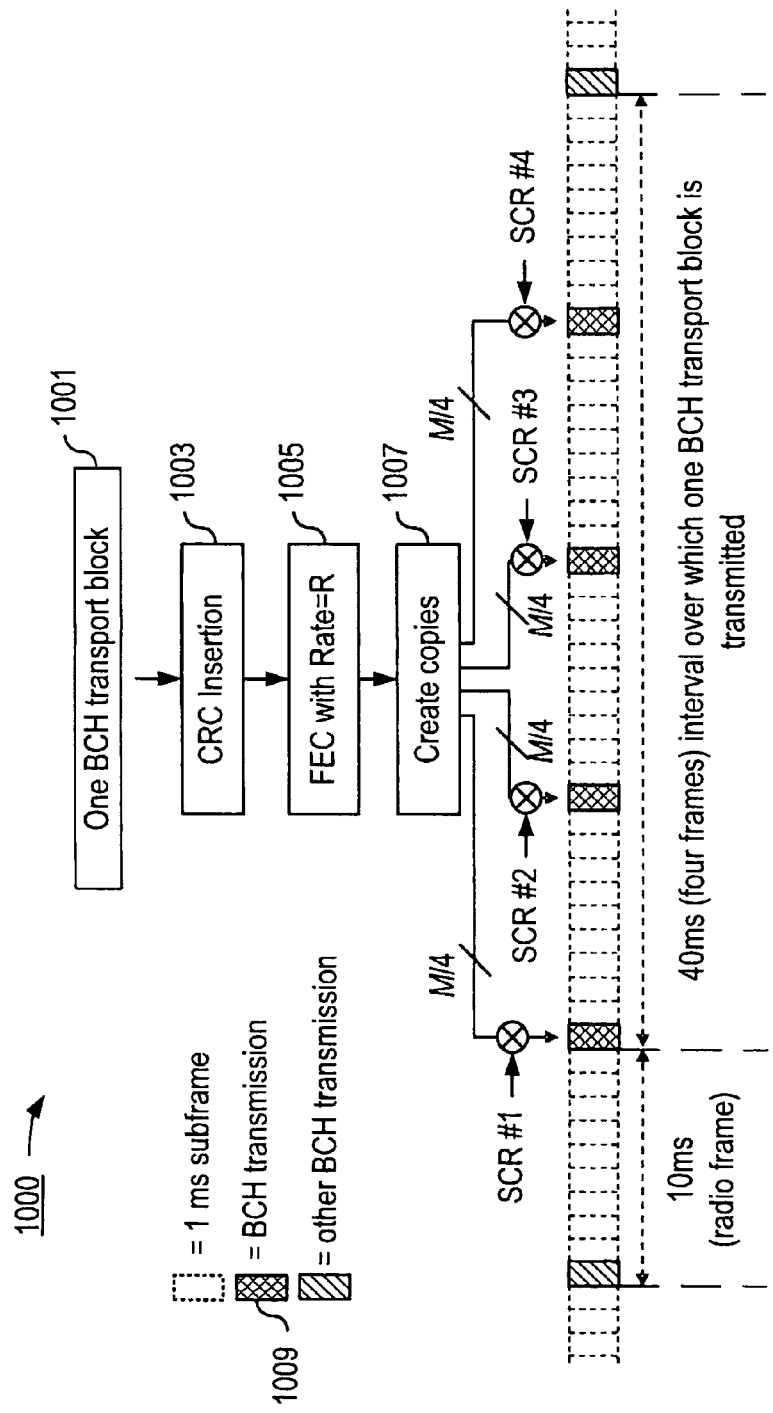
FIG. 10 is a flow diagram illustrating steps/processes carried out in a node of a mobile communications system in accordance with an aspect of embodiments consistent with the invention.

FIG. 10 is a flow diagram illustrating steps/processes carried out in a node (e.g. a base station) of a mobile communications system in accordance with an aspect of embodiments consistent with the invention. FIG. 10 can also be considered to depict a node 1000 and its relevant logic configured to carry out the functions described in the figure. A BCH transport block 1001 is presented for communication over the communication system's physical resource (e.g. BCH). A CRC value is calculated based on the received BCH transport block 1001, and appended to the block (step 1003). The CRC will enable a recipient to determine whether the received block is correct.

The resulting bits are then subjected to FEC processing (step 1005), which in this embodiment involves using a rate, R, that enables the coded block to fit into a single sub-frame. The coded bits are then replicated (step 1007) to create a total of M bits of coded information (step 1007). $N_{frames}$ segments (e.g. four segments) of coded bits are then formed from the M bits of coded information, wherein the BCH information can be derived from any one of the $N_{frames}$ segments of coded bits.

Next, the node 1000 applies a unique one of $N_{frames}$ mapping functions to each of the $N_{frames}$ segments of coded bits to produce $N_{frames}$ mapped segments of coded bits. In this embodiment, this is carried out by scrambling each of the $N_{frames}$ segments of coded bits by a unique one of $N_{frames}$ different scrambling patterns (e.g., SCR#1, SCR#2, SCR#3, SCR#4) to produce $N_{frames}$ segments of scrambled bits. The $N_{frames}$ different scrambling patterns are such that, for any one of the $N_{frames}$ segments of scrambled bits, successful derivation of the BCH information is assured only when a decoding process is applied to the $N_{frames}$ segments of coded bits. Expressed another way, correct decoding of the information conveyed by any of the segments of scrambled bits cannot be assured unless the segment of scrambled bits is treated in an unscrambled way (e.g. by actually first unscrambling the segment, and then decoding the unscrambled bits). It will be appreciated that treating a segment of scrambled bits "in an unscrambled way" includes but does not require that bits actually be moved as part of an unscrambling process.

A different one of the $N_{frames}$ segments of scrambled bits is then transmitted in each of $N_{frames}$ frames (e.g. in an LTE system, in each of four consecutively occurring frames, as illustrated in FIG. 10).

Figure 11:
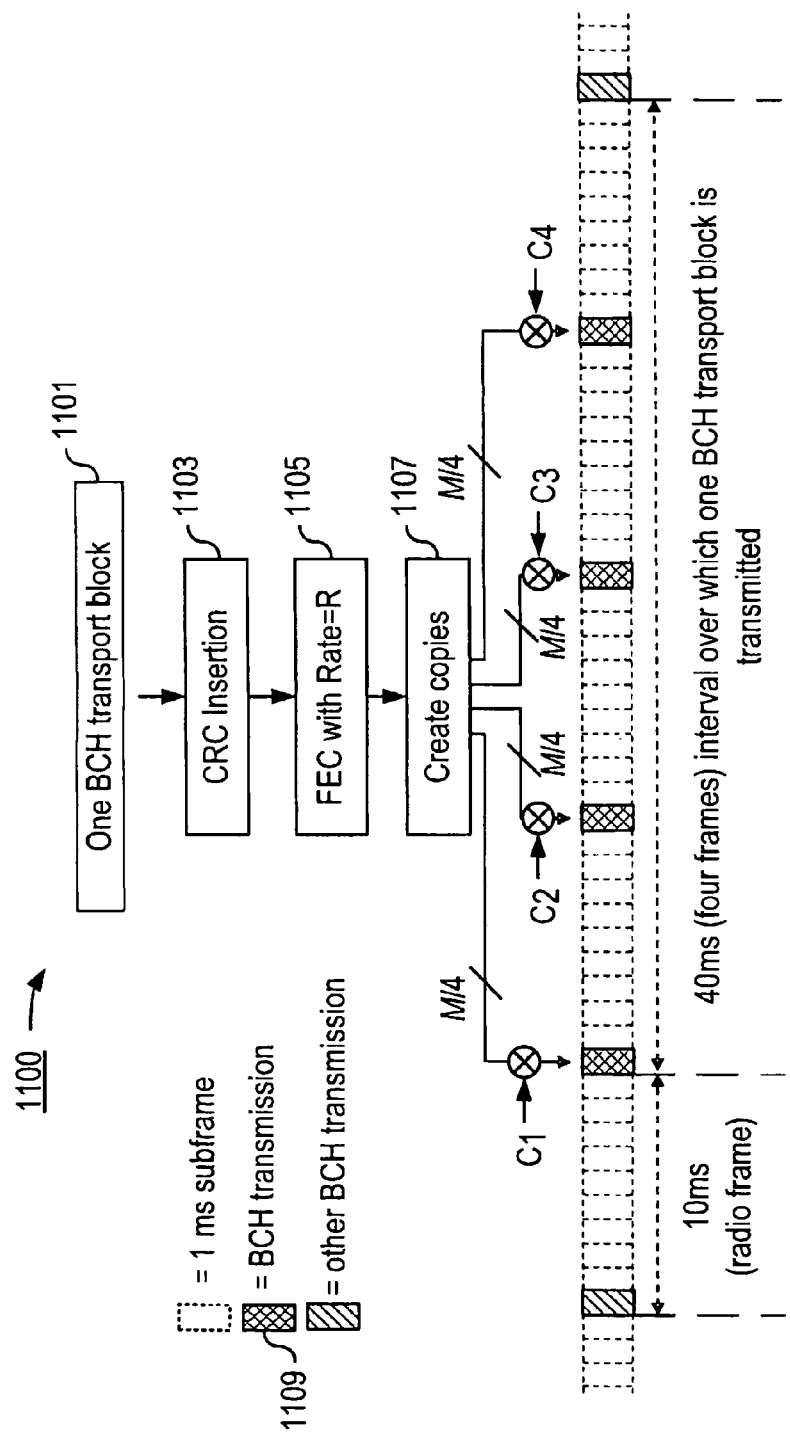
FIG. 11 is a flow diagram illustrating steps/processes carried out in an alternative embodiment of a node of a mobile communications system in accordance with an aspect of embodiments consistent with the invention.

FIG. 11 is a flow diagram illustrating steps/processes carried out in an alternative embodiment of a node (e.g., a base station) of a mobile communications system in accordance with an aspect of embodiments consistent with the invention. FIG. 11 can also be considered to depict a node 1100 and its relevant logic configured to carry out the functions described in the figure. A BCH transport block 1101 is presented for communication over the communication system's physical resource (e.g. BCH). A CRC value is calculated based on the received BCH transport block 1101, and appended to the block (step 1103). The CRC will enable a recipient to determine whether the received block is correct.

The resulting bits are then subjected to FEC processing (step 1105), which in this embodiment involves using a rate, R, that enables the coded block to fit into a single sub-frame. The coded bits are then replicated (step 1107) to create a total of M bits of coded information (step 1107). $N_{frames}$ segments (e.g., four segments) of coded bits are then formed from the M bits of coded information, wherein the BCH information can be derived from any one of the $N_{frames}$ segments of coded bits.

Next, the node 1100 applies a unique one of $N_{frames}$ mapping functions to each of the $N_{frames}$ segments of coded bits to produce $N_{frames}$ mapped segments of coded bits. In this embodiment, this is carried out by applying a different one of $N_{frames}$ different codes to each of the $N_{frames}$ segments of coded bits to produce $N_{frames}$ segments of doubly coded bits. For example, logic in the node 1100 multiplies each of the $N_{frames}$ segments of coded bits (or each of the $N_{frames}$ segments of modulation symbols) by a different one of $N_{frames}$ different codes to produce $N_{frames}$ segments of multiplied bits. The codes are selected such that, for any one of the $N_{frames}$ segments of multiplied bits, successful derivation of the BCH information is assured only when a decoding process is applied to the $N_{frames}$ segments of coded bits. Expressed another way, correct decoding of the information conveyed by any of the segments of multiplied bits cannot be assured unless the segment of multiplied bits is treated in a way that removes the applied multiplication.

In these embodiments, a length-$N_{frames}$ code (e.g., in this exemplary embodiment a length-4 code $c_1, c_2, c_3, c_4$) can be used. One possible code could be one having the four elements +1 −1 −1 +1, but other codes are also possible. This means that each coded bit (or each modulation symbol) to be transmitted within the same subframe is multiplied by the same code symbol or element $c_1$. Different code elements are used for different subframes.

A different one of the $N_{frames}$ segments of doubly coded (e.g., multiplied) bits is then transmitted in each of $N_{frames}$ frames (e.g., in an LTE system, in each of four consecutively occurring frames, as illustrated in FIG. 11).

Figure 7:
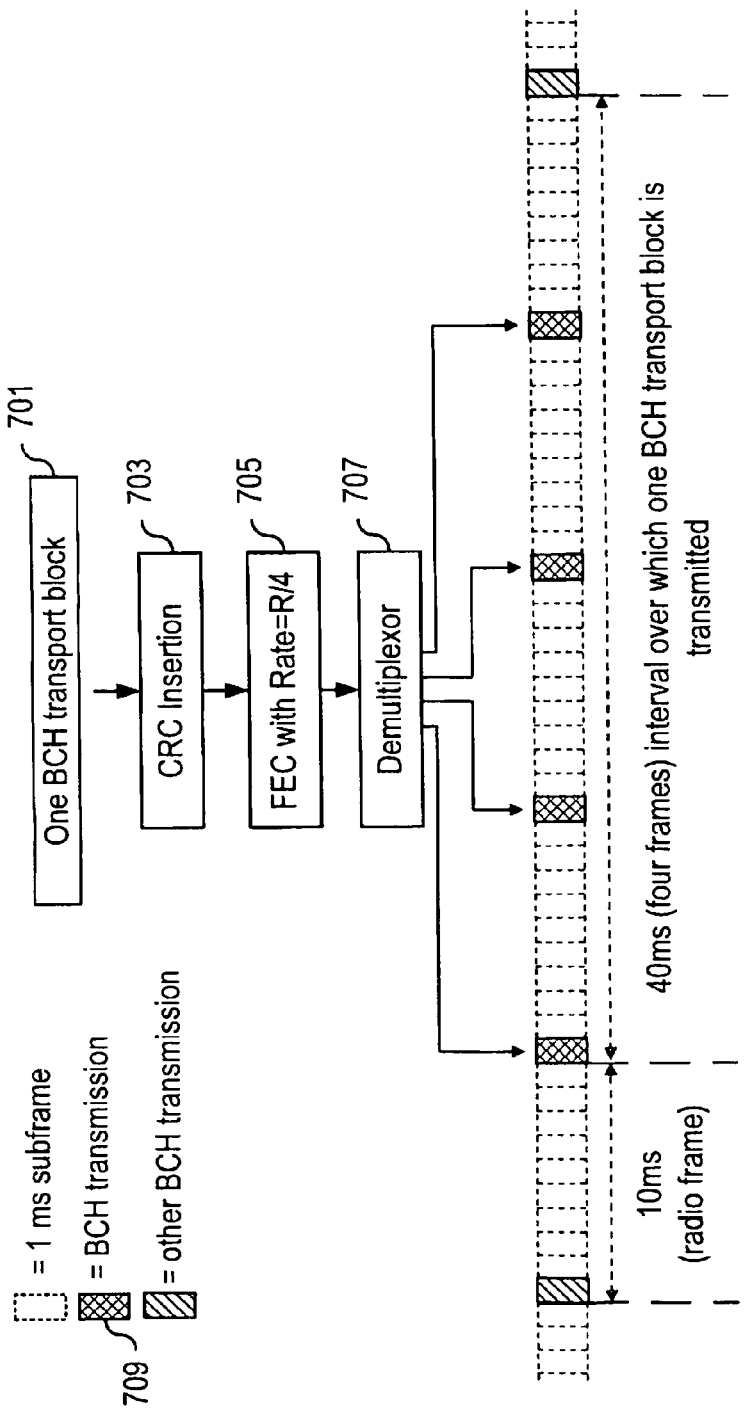
FIG. 7 is a block diagram illustrating the physical layer logical elements involved in an alternative way of enabling the decoding of a BCH transport block without utilizing all of the BCH segments conveying that BCH transport block.
Figure 8:
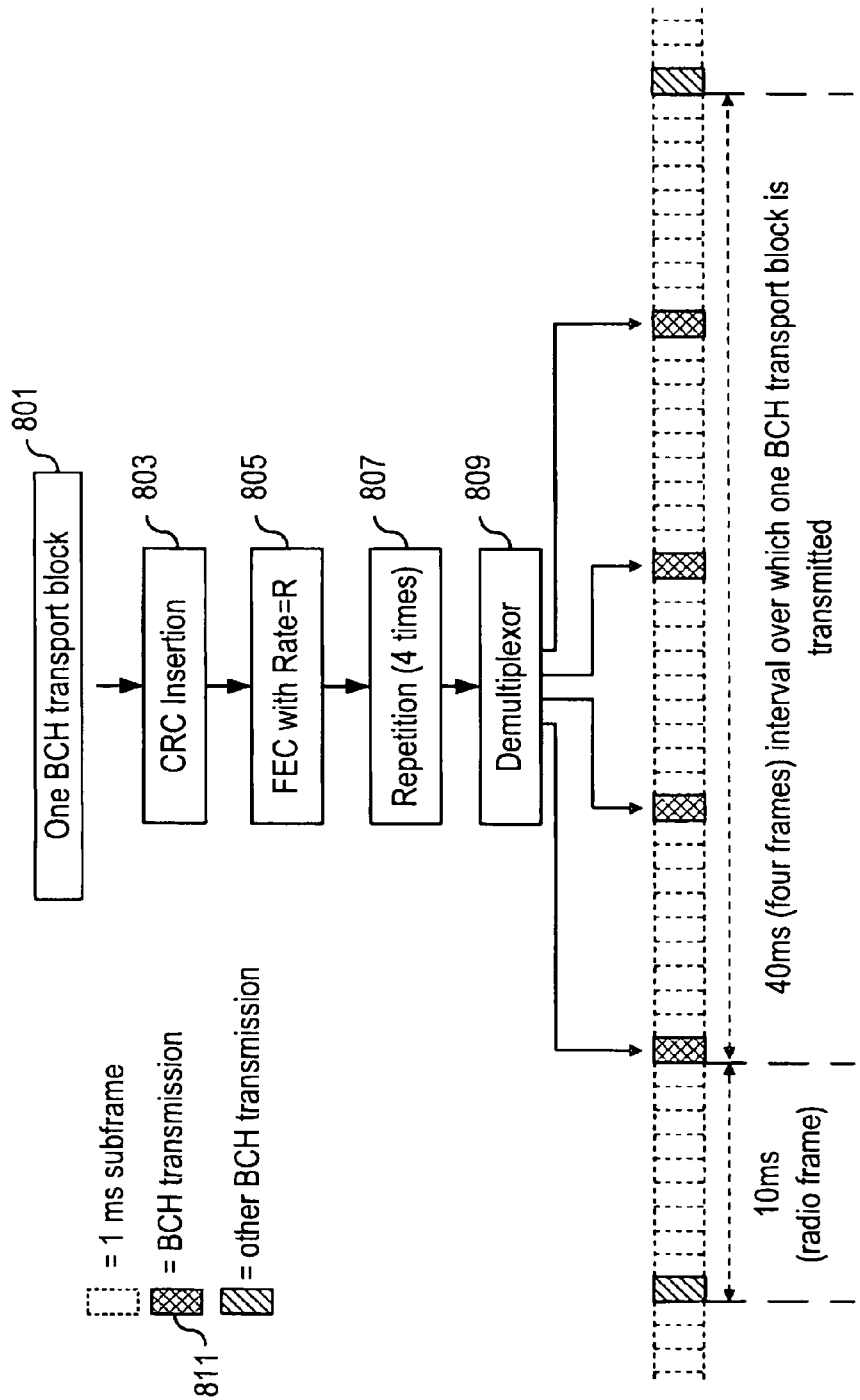
FIG. 8 is a block diagram illustrating the physical layer logical elements involved in yet another alternative way of enabling the decoding of a BCH transport block without utilizing all of the BCH segments conveying that BCH transport block.

In each of the exemplary embodiments illustrated in FIGS. 10 and 11, the FEC coding was R, which enabled the coded block to fit into a single sub-frame. Production of the full set of M bits that would be distributed over the $N_{frames}$ frames was therefore implemented by means of replication. It will be recognized, however, that this is not a restriction imposed by the invention. For example, in alternative embodiments, a slower coding rate (e.g. R/4) could be used, and demultiplexing applied, in a manner that is similar to that illustrated in FIG. 7. In this case, the receiver relies on the channel code's capability to correct loss of data. In essence, using only a single subframe for the BCH decoding would correspond to a loss of at least 75% of the coded bits. A sufficiently low rate code $R_{low}$ can, in such a case, still provide correct decoding of the BCH transport block if the channel conditions are sufficiently good.

Figure 12:
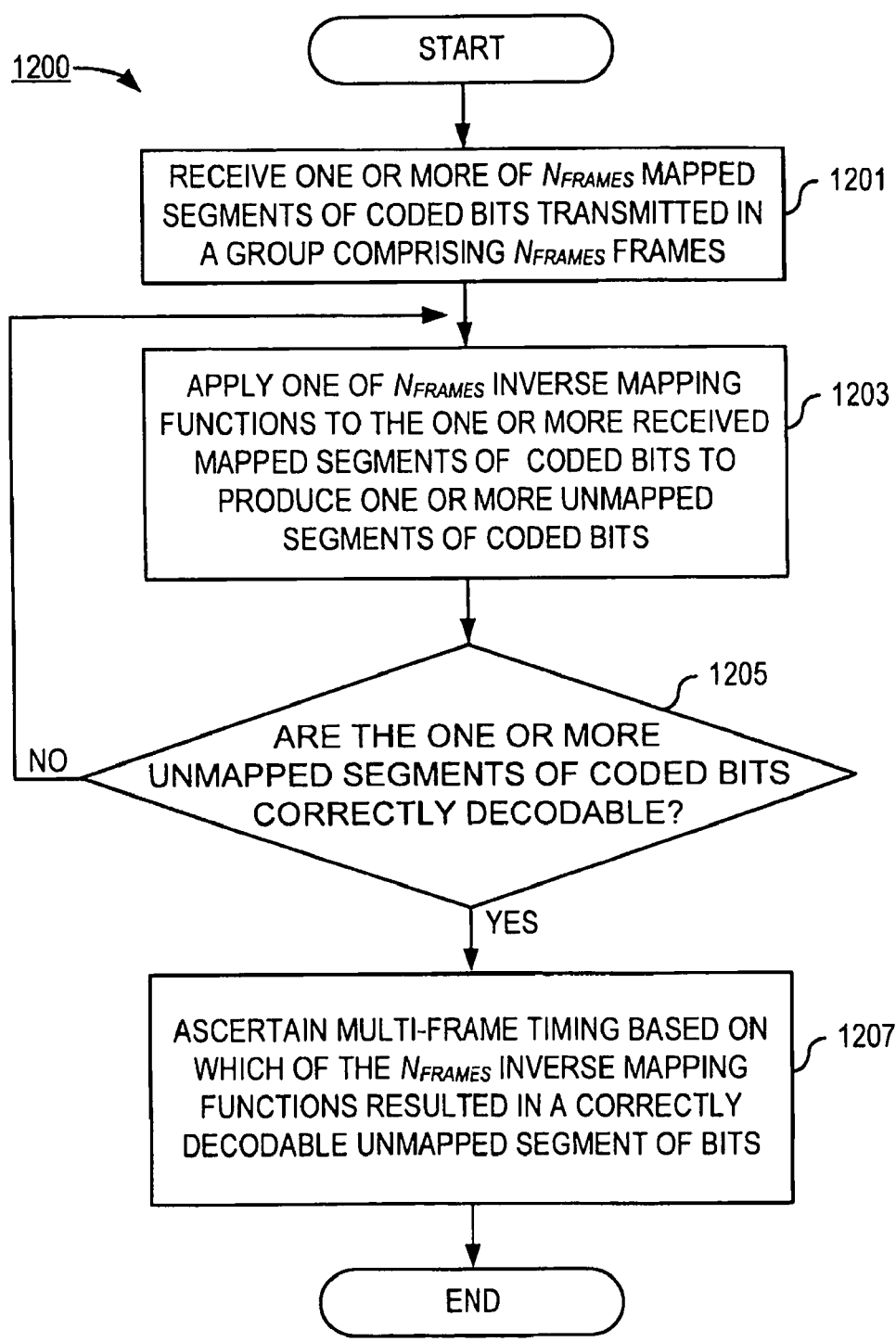
FIG. 12 is a flow diagram illustrating steps/processes carried out in receiver (e.g. a UE) operating in a mobile communications system in accordance with an aspect of embodiments consistent with the invention.

FIG. 12 is a flow diagram illustrating steps/processes carried out in receiver (e.g., a UE) operating in a mobile communications system in accordance with an aspect of embodiments consistent with the invention. FIG. 12 can also be considered to depict a receiver 1200 and its relevant logic configured to carry out the functions described in the figure.

The embodiment of FIG. 12 is able to receive a broadcast control channel (BCH) transport block without requiring receipt of all $N_{frames}$, (e.g. 4) segments of the transmitted mapped segments of coded bits, and is further able to determine multi-frame timing (e.g. in an LTE system, the 40 ms timing) from fewer than all $N_{frames}$ segments of the transmitted mapped segments of coded bits. The technique involves receiving (1201) one or more of $N_{frames}$ mapped segments of coded bits that have been transmitted in a group comprising $N_{frames}$ frames. These segments have been generated by a process such as that described above with respect to FIGS. 9, 10, and 11.

Next, the receiver 1200 applies (1203) one or more inverse mapping functions to the one or more received mapped segments of coded bits to produce one or more unmapped segments of coded bits, wherein the one or more inverse mapping functions are selected from $N_{frames}$ inverse mapping functions. The inverse mapping functions are designed to remove the mapping that was applied by the transmitting node. For example, where scrambling was applied at the node (e.g. as illustrated in FIG. 10), the inverse mapping functions apply inverse scrambling functions that can restore the original order of the bits in the segments of coded bits. Similarly, where coding was applied at the node (e.g., as illustrated in FIG. 11), the inverse mapping functions apply an inverse coding by, for example, multiplying the received mapped segments of coded bits by, in the general case, a complex conjugate of the version of the code applied at the transmitter.

The one or more unmapped segments of bits are then test (decision block 1205) to determine it (they) is (are) correctly decodable. If not ("NO" path out of decision block 1205), processing returns to step 1203 where another one of the $N_{frames}$ inverse mapping functions is applied to the one or more received mapped segments of coded bits.

At some point, the one or more unmapped segments of coded bits will represent one or more of the $N_{frames}$ segments of coded bits originally generated at the transmitting node (i.e., the coded bits prior to mapping), and will be correctly decodable ("YES" path out of decision block 1205). The multi-frame timing can now be ascertained (step 1207) based on which of the $N_{frames}$ inverse mapping functions resulted in a correctly decodable unmapped segment of bits because this inverse mapping function identifies which of the $N_{frames}$ segments were decoded (e.g., whether it was segment 1, segment 2, . . . , segments 1 and 2, segments 2 and 3, . . . , and so on).

Figure 13:
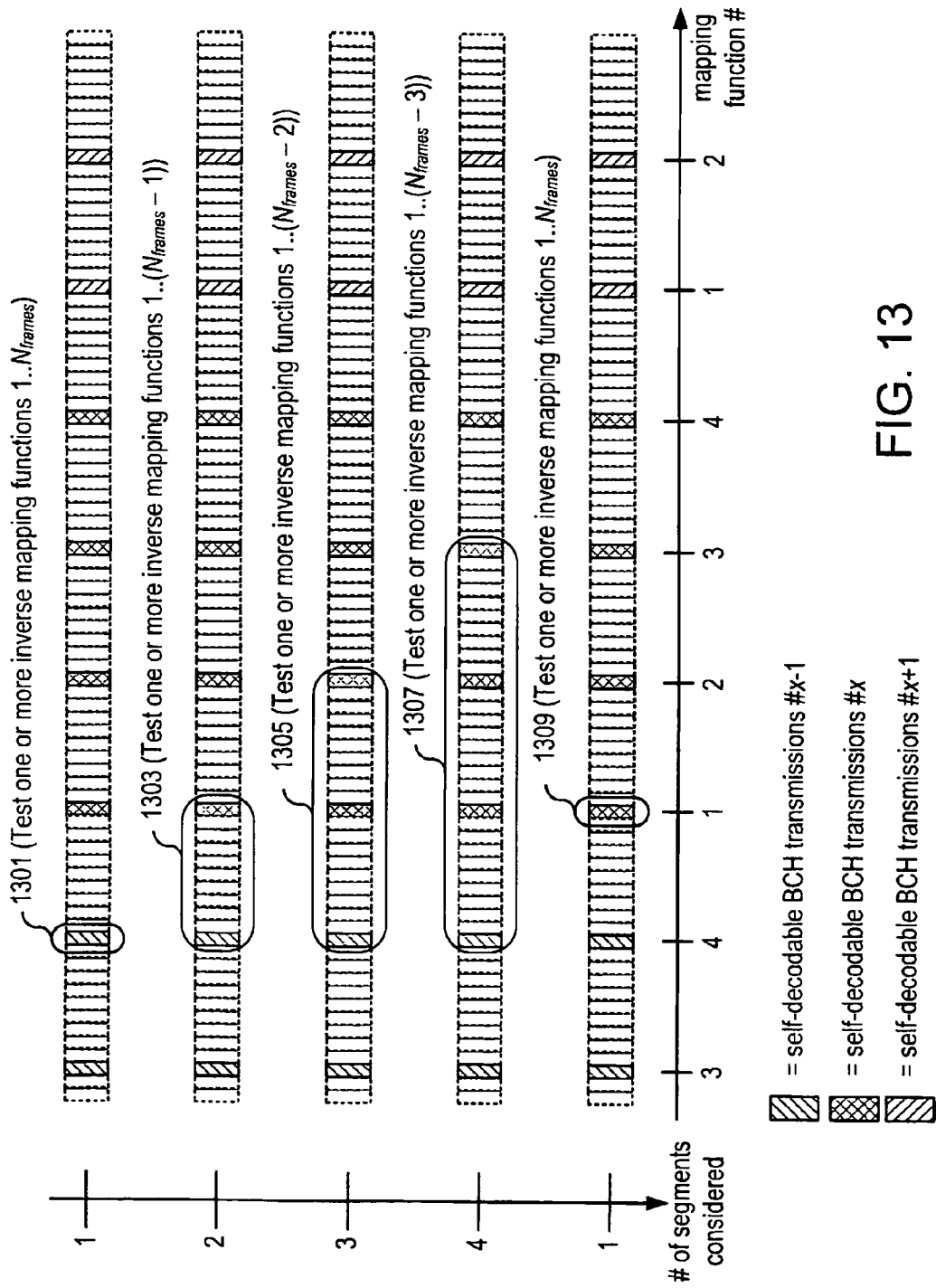
FIG. 13 is diagram illustrating an exemplary received signal over the course of a number of frames, and an exemplary course of a terminal's processing of that signal in accordance with aspects of the invention.

This receiver process is further illustrated in FIG. 13, which illustrates an exemplary received signal over the course of a number of frames, as well as an exemplary course of a terminal's (e.g. a UE's) processing of that signal. The BCH transmissions are all self-decodable at the segment level, so that, under favorable channel conditions, the UE need not receive all $N_{frames}$ segments (in this example, $N_{frames}=4$) in order to be able decode the BCH transport block.

Here it is initially assumed that the terminal has determined the frame (but not the multi-frame) timing, and has just received the fourth segment of the BCH transmission #x−1. In accordance with an aspect of the invention, and assuming that $N_{frames}=4$, the received BCH segment will have been processed by the fourth mapping function, which indicates that it is the fourth segment of the 4-part BCH transmission. Therefore, in order to correctly decode this segment, the terminal will have to apply the fourth inverse mapping function to restore the bits to their original coded form. Correct decoding may then be possible.

However, since the terminal does not yet know the multi-frame timing, it does not know which of the four BCH segments it has received. Therefore, it will try unmapping the received BCH segment by one or more of the four possible inverse mapping functions and will try to decode these one or more unmapped segments (step 1301). Being the fourth of the four segments, correct decoding will only be assured after the fourth inverse mapping function is tried.

If a correct decoding occurs (as indicated by, for example, a correct CRC calculation), the terminal not only has the information communicated by the BCH segment, but also now knows the multi-frame timing since, in this example, the fourth inverse mapping function is associated with the fourth of the four frames over which the BCH transmission occurs. BCH reception can therefore stop at this point.

However, as mentioned earlier, channel conditions play a part in whether correct decoding of a segment is possible. Assume, now, that even when properly unmapped, the channel quality was too poor to permit the BCH to be decoded from just one segment. In some embodiments, processing can then proceed by allowing the terminal to receive another BCH segment. In order to improve decoding performance, the terminal will want to combine the second received segment with the earlier-received segment. However, proper decoding can only be assured if these segments are first restored to their unmapped versions. Since, in this but not necessarily all embodiments, mapping functions are always applied at the same, known, order by the transmitting node, it is not necessary to try every possible combination of inverse mapping functions. Rather, the terminal can assume that the proper inverse mapping functions are #'s 1 and 2, or 2 and 3, or 3 and 4. Since the segment #4 of one BCH will not be associated with a subsequently segment #1 of another BCH, there is not need to test this possibility since these segments should not be combined.

Accordingly, the terminal will try unmapping the two received BCH segments by one or more of the three possible combinations of inverse mapping functions and will try to combine and then decode these one or more unmapped combined segments (step 1303). In this particular example, correct decoding should not occur because the fourth segment of BCH transmission #x−1 is being combined with the first segment of BCH transmission #x. That is, even if proper unmapping functions were to be applied, these segments do not belong to the same BCH, and should therefore not be combined.

The terminal will detect the failed decoding, but will not know whether it is due to its trying to combine two segments which belong to different BCH's (as is really the case in this example), or whether the failure is due to poor channel conditions. Therefore, the terminal will continue by receiving a third segment, which it will want to combine with the two it has already received. But first, the terminal must unmap the segments in order to assure even the possibility of correct decoding. When the three consecutive segments are considered, the only possible inverse mapping functions are #'s 1, 2, and 3: or 2, 3, and 4. Any other possibilities would imply combining segments from unrelated BCH's, and there is no point in even testing this.

Accordingly, the terminal will try unmapping the three received BCH segments by one or more of the two possible combinations of inverse mapping functions and will try to combine and then decode these one or more unmapped combined segments (step 1305). In this particular example, correct decoding should not occur because the fourth segment of BCH transmission #x−1 is being combined with the first and second segments of BCH transmission #x. That is, even if proper unmapping functions were to be applied, these segments do not belong to the same BCH, and should therefore not be combined.

The terminal will detect the failed decoding, but will still not know whether it is due to its trying to combine three segments which belong to two different BCH's (as is really the case in this example), or whether the failure is due to poor channel conditions. Therefore, the terminal will continue by receiving a fourth segment, which it will want to combine with the three it has already received. But again, the terminal must first unmap the segments in order to assure even the possibility of correct decoding. When the four consecutive segments are considered, there is only one possible inverse mapping function: 1, 2, 3, and 4. Any other possibility would imply combining segments from unrelated BCH's, and there is no point in even testing this.

Accordingly, the terminal will try unmapping the four received BCH segments by the only possible combination of inverse mapping functions and will try to combine and then decode these unmapped combined segments (step 1307). Despite having received the maximum number of BCH segments (in this example, four) correct decoding should not occur because the fourth segment of BCH transmission #x−1 is being combined with the first, second and third segments of BCH transmission #x. That is, even after applying the theoretically proper unmapping function, these segments do not belong to the same BCH, and should therefore not be combined.

The terminal will detect this decoding failure, and can then (in this case correctly) assume that this failure is caused by the first received segment not being related to later received segments. The terminal can therefore discard the first received BCH segment, and begin processing all over again with the second received BCH segment. One possibility is to consider the second received segment by itself. In this embodiment, the terminal will try unmapping the received BCH segment by one or more of the four possible inverse mapping functions and will try to decode these one or more unmapped segments (step 1309). Being the first of the four segments, correct decoding will, in this example, only be assured after the first inverse mapping function is tried.

If a correct decoding occurs (as indicated by, for example, a correct CRC calculation), the terminal not only has the information communicated by the BCH segment, but also now knows the multi-frame timing since, in this example, the first inverse mapping function is associated with the first of the four frames over which the BCH transmission occurs. BCH reception can therefore stop at this point.

If decoding fails, the terminal can proceed in a manner similar to that described above: the terminal tries unmapping and then combining two or more segments, which combination is then decoded.

It will be appreciated that there are many possible variations on these embodiments. For example, instead of testing only a single segment at step 1309, the terminal could instead have tried combining that segment with the two that allowed, since these had already been received.

In other alternatives, the UE could try to test just single BCH segments prior to attempting to combine them (e.g. perform step 1309 prior to performing any of steps 1303, 1305, and 1307).

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of communicating a broadcast control channel, BCH, transport block in a cellular communications system having a physical layer in which information is communicated in one or more frames, wherein the BCH transport block represents BCH information, the method comprising:
   coding the BCH transport block to generate M bits of coded information, wherein M is an integer;
   forming $N_{frames}$ segments of coded bits from the M bits of coded information, wherein the BCH information can be derived from any one of the $N_{frames}$ segments of coded bits;
   applying a unique one of $N_{frames}$ mapping functions to each of the $N_{frames}$ segments of coded bits to produce $N_{frames}$ mapped segments of coded bits; and
   transmitting a different one of the $N_{frames}$ mapped segments of coded bits in each of $N_{frames}$ frames.

2. The method of claim 1, wherein $N_{frames}=4$.

3. The method of claim 1, wherein the $N_{frames}$ frames are $N_{frames}$ consecutively occurring frames.

4. The method of claim 1, wherein applying a unique one of $N_{frames}$ mapping functions to each of the $N_{frames}$ segments of coded bits to produce $N_{frames}$ mapped segments of coded bits comprises:
   scrambling each of the $N_{frames}$ segments of coded bits by a unique one of $N_{frames}$ different scrambling patterns, to produce $N_{frames}$ segments of scrambled bits, wherein, for any one of the $N_{frames}$ segments of scrambled bits, successful derivation of the BCH information is assured only when a decoding process is applied to the $N_{frames}$ segments of coded bits.

5. The method of claim 1, wherein applying a unique one of $N_{frames}$ mapping functions to each of the $N_{frames}$ segments of coded bits to produce $N_{frames}$ mapped segments of coded bits comprises:
   multiplying each of the $N_{frames}$ segments of coded bits by a different one of $N_{frames}$ different code elements, to produce $N_{frames}$ segments of multiplied bits, wherein, for any one of the $N_{frames}$ segments of multiplied bits, successful derivation of the BCH information is assured only when a decoding process is applied to the $N_{frames}$ segments of coded bits.

6. A method of receiving a broadcast control channel (BCH) transport block and determining multi-frame timing in a cellular communications system having a physical layer in which information is communicated in one or more frames, wherein the BCH transport block represents BCH information, the method comprising:
   receiving one or more of $N_{frames}$ mapped segments of coded bits that have been transmitted in a group comprising $N_{frames}$ frames;
   applying one or more inverse mapping functions to the one or more received mapped segments of coded bits to produce one or more unmapped segments of coded bits, wherein the one or more inverse mapping functions are selected from $N_{frames}$ inverse mapping functions;
   testing at least one of the one or more unmapped segments of bits to determine whether the at least one of the one or more unmapped segments of bits is correctly decodable; and
   ascertaining multi-frame timing based on which of the $N_{frames}$ inverse mapping functions resulted in a correctly decodable unmapped segment of bits.

7. The method of claim 6, wherein $N_{frames}=4$.

8. The method of claim 6, wherein the $N_{frames}$ frames are $N_{frames}$ consecutively occurring frames.

9. The method of claim 6, wherein applying one or more inverse mapping functions to the one or more received mapped segments of coded bits to produce one or more unmapped segments of coded bits comprises:
applying one or more of $N_{frames}$ unscrambling functions to the one or more received mapped segments of coded bits to produce one or more unscrambled segments of coded bits.

10. The method of claim 6, wherein applying one or more inverse mapping functions to the one or more received mapped segments of coded bits to produce one or more unmapped segments of coded bits comprises:
multiplying each of the one or more received mapped segments of coded bits by a conjugate of one or more of $N_{frames}$ code elements to produce one or more multiplied segments of coded bits.

11. An apparatus for communicating a broadcast control channel (BCH) transport block in a cellular communications system having a physical layer in which information is communicated in one or more frames, wherein the BCH transport block represents BCH information, the apparatus comprising:
logic configured to code the BCH transport block to generate M bits of coded information, wherein M is an integer;
logic configured to form $N_{frames}$ segments of coded bits from the M bits of coded information, wherein the BCH information can be derived from any one of the $N_{frames}$ segments of coded bits;
logic configured to apply a unique one of $N_{frames}$ mapping functions to each of the $N_{frames}$ segments of coded bits to produce $N_{frames}$ mapped segments of coded bits; and
logic configured to transmit a different one of the $N_{frames}$ mapped segments of coded bits in each of $N_{frames}$ frames.

12. The apparatus of claim 11, wherein $N_{frames}=4$.

13. The apparatus of claim 11, wherein the $N_{frames}$ frames are $N_{frames}$ consecutively occurring frames.

14. The apparatus of claim 11, wherein the logic configured to apply a unique one of $N_{frames}$ mapping functions to each of the $N_{frames}$ segments of coded bits to produce $N_{frames}$ mapped segments of coded bits comprises:
logic configured to scramble each of the $N_{frames}$ segments of coded bits by a unique one of $N_{frames}$ different scrambling patterns, to produce $N_{frames}$ segments of scrambled bits, wherein, for any one of the $N_{frames}$ segments of scrambled bits, successful derivation of the BCH information is assured only when a decoding process is applied to the $N_{frames}$ segments of coded bits.

15. The apparatus of claim 11, wherein the logic configured to apply a unique one of $N_{frames}$ mapping functions to each of the $N_{frames}$ segments of coded bits to produce $N_{frames}$ mapped segments of coded bits comprises:
logic configured to multiply each of the $N_{frames}$ segments of coded bits by a different one of $N_{frames}$ different code elements, to produce $N_{frames}$ segments of multiplied bits, wherein, for any one of the $N_{frames}$ segments of multiplied bits, successful derivation of the BCH information is assured only when a decoding process is applied to the $N_{frames}$ segments of coded bits.

16. An apparatus for receiving a broadcast control channel (BCH) transport block and determining multi-frame timing in a cellular communications system having a physical layer in which information is communicated in one or more frames, wherein the BCH transport block represents BCH information, the apparatus comprising:
logic configured to receive one or more of $N_{frames}$ mapped segments of coded bits that have been transmitted in a group comprising $N_{frames}$ frames;
logic configured to apply one or more inverse mapping functions to the one or more received mapped segments of coded bits to produce one or more unmapped segments of coded bits, wherein the one or more inverse mapping functions are selected from $N_{frames}$ inverse mapping functions;
logic configured to test at least one of the one or more unmapped segments of bits to determine whether the at least one of the one or more unmapped segments of bits is correctly decodable; and
logic configured to ascertain multi-frame timing based on which of the $N_{frames}$ inverse mapping functions resulted in a correctly decodable unmapped segment of bits.

17. The apparatus of claim 16, wherein $N_{frames}=4$.

18. The apparatus of claim 16, wherein the $N_{frames}$ frames are $N_{frames}$ consecutively occurring frames.

19. The apparatus of claim 16, wherein the logic configured to apply one or more inverse mapping functions to the one or more received mapped segments of coded bits to produce one or more unmapped segments of coded bits comprises:
logic configured to apply one or more of $N_{frames}$ unscrambling functions to the one or more received mapped segments of coded bits to produce one or more unscrambled segments of coded bits.

20. The apparatus of claim 16, wherein the logic configured to apply one or more inverse mapping functions to the one or more received mapped segments of coded bits to produce one or more unmapped segments of coded bits comprises:
logic configured to multiply each of the one or more received mapped segments of coded bits by a conjugate of one or more of $N_{frames}$ code elements to produce one or more multiplied segments of coded bits.

* * * * *